United States Patent [19]

Grube et al.

[11] Patent Number: 5,594,796
[45] Date of Patent: Jan. 14, 1997

[54] METHOD AND APPARATUS FOR DETECTING UNAUTHORIZED DISTRIBUTION OF DATA

[75] Inventors: Gary W. Grube, Palatine, Ill.; Timothy W. Markison; Mathew A. Rybicki, both of Austin, Tex.

[73] Assignee: Motorola, Inc., Schaumburg, Ill.

[21] Appl. No.: 317,664

[22] Filed: Oct. 5, 1994

[51] Int. Cl.$^6$ .................................................. H04L 9/00
[52] U.S. Cl. .......................................................... 380/25
[58] Field of Search .................................... 380/23, 25

[56] References Cited

U.S. PATENT DOCUMENTS

| | | | |
|---|---|---|---|
| 5,204,897 | 4/1993 | Wyman | 380/25 |
| 5,237,614 | 8/1993 | Weiss | 380/23 |
| 5,455,953 | 10/1995 | Russell | 380/23 |

*Primary Examiner*—David C. Cain
*Attorney, Agent, or Firm*—Christopher P. Moreno

[57] ABSTRACT

Unauthorized distribution of data within a wireless communication system (101–102) can be detected by coupling a security gateway (103) between the wireless communication system (101–102) and a public data base system (104). When the public data base system (104) sends data to a requesting member of the wireless communication system (101–102), the data is intercepted by the security gateway (103). As the security gateway (103) is receiving the data, it is searching the data for a security tag. When a security tag is found, the security gateway (103) determines whether the security tag is assigned to the particular data base transmitting the data (105–106). If the security tag is not assigned to the particular data base, the security gateway identifies the particular data base as a potential unauthorized distributor of data (117).

11 Claims, 3 Drawing Sheets

METHOD AND APPARATUS FOR DETECTING UNAUTHORIZED DISTRIBUTION OF DATA

TECHNICAL DESCRIPTION OF THE INVENTION

The present invention relates generally to data distribution and in particular to a method and apparatus for detecting unauthorized distribution of data.

BACKGROUND OF THE INVENTION

Wireless communication systems are known to include a plurality of communication units, a limited number of wireless communication resources, and a communication resource controller. A typical communication unit, which may be a mobile radio, portable radio, or radio/telephone, offers its user a variety of features, such as group calls (i.e., one-to-many communications), telephone interconnect calls (i.e., one-to-one communications), and data communications. To access one of these services, the user must request access to one of the limited number of wireless communication resources and specify the type of service requested. This request is sent from the communication unit to the communication resource controller via a control channel, wherein the control channel is one of the communication resources that has been selected to function as the control channel. Upon receiving the request, the communication resource controller determines whether this particular communication unit is authorized to access the requested service and, if so, whether a communication resource is available for allocation. When both conditions are positive, the communication resource controller allocates a communication resource to the requesting communication unit such that the user can access the requested service.

In addition to allocating a communication resource, the communication resource controller may also need to establish a communication path within a public data communication interconnect system, such as a public switch telephone network (PSTN), to complete the service request. For example, if the requested service is for a data communication, in which the user is requesting that a data file be transferred to it via the wireless communication system, the communication resource controller would need to allocate a wireless communication resource to the requesting communication unit and also establish a wireline communication path with the holder of the requested data file via the public data system. Once both of these communication paths (i.e., the wireless path and the wireline path) have been established, the requested data file can be transferred to the requesting communication unit.

The above described data transfer is becoming more and more common as technological advances occur in both the wireless art and the wireline art. These technologic advances are allowing more data to be transferred in less time via data compression, time division multiplexing, quadrature amplitude modulation techniques, ADSL, MPEG standards, ISDN, and spread spectrum techniques. As the amount and frequency of data transmissions increase, so does the chance for pirating this data. Pirating of data transmissions, which may include video data (i.e., movies), audio data (i.e., music or conversations), data files (e.g., police files, books, etc.), occurs by having an RF receiver in range of a wireless communication system to receive the data transmissions. Recall that for a wireless transmission, an antenna transmits the data in a radial pattern, such that any properly tuned receiver within the radial pattern may receive the transmission.

In a typical wireless communication system, before the data is transmitted, the requesting communication unit or units are addressed via the control channel and instructed to affiliate with another communication resource to receive the data transmission. Even though all the communication units within range of the control channel's antenna receive the addressing information, only the communication unit or units that are addressed will affiliate with the communication resource. In an ideal system (i.e., one without pirates), only the authorized communication units receive the requested data. Unfortunately, there are few, if any, ideal systems left, thus pirating is a real and serious problem.

To illustrate the severity of pirating, the software industry lost billions of dollars in 1993, while the wireless communication industry lost millions of dollars. As the user demands increase for more data, pirating of data is only going to increase accordingly. Therefore, a need exists for a method and apparatus that detects authorized distribution of data by pirates, such that appropriate action may be taken.

DETAILED DESCRIPTION OF A PREFERRED EMBODIMENT

Generally, the present invention provides a method and apparatus for detecting unauthorized distribution of data within a wireless communication system. This is accomplished by coupling a security gateway between the wireless communication system and a public data base system. When the public data base system sends data to a requesting member of the wireless communication system, the data is intercepted by the security gateway. As the security gateway is receiving the data, it is searching the data for a security tag. When a security tag is found, the security gateway determines whether the security tag is assigned to the particular data base transmitting the data. If the security tag is not assigned to the particular data base, the security gateway identifies the particular data base as a potential unauthorized distributor of data. With such a method and apparatus, the unauthorized distribution of data within a wireless communication system can be identified and subsequently prevented, thereby recapturing stolen revenues for the owners of the data and the wireless communication system.

Figure 1:
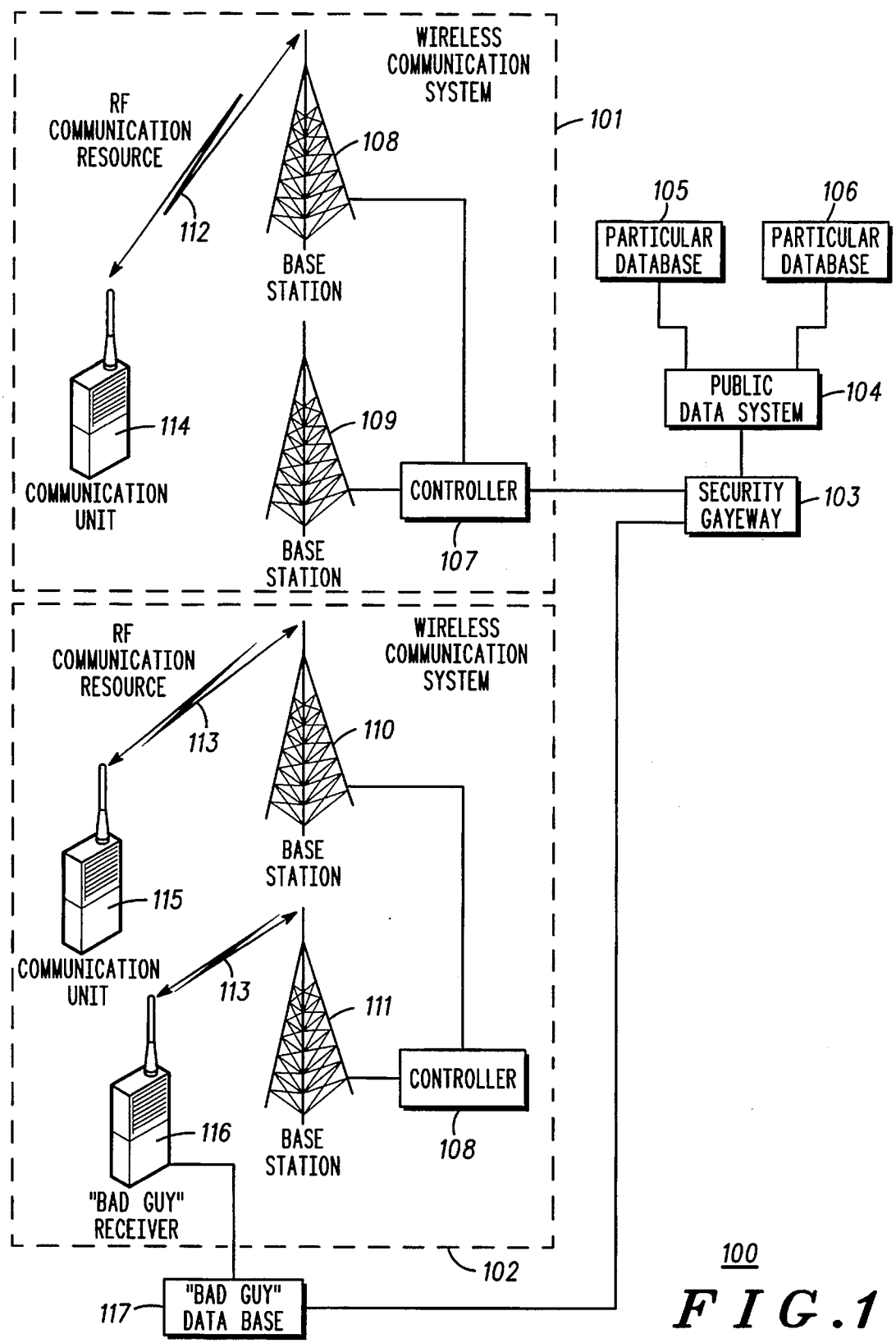
FIG. 1 illustrates a communication environment in accordance with the present invention.

FIG. 1 illustrates a communication environment 100 that includes wireless communication systems 101–102, a security gateway 103, a public data system 104, authorized data distributors or data sources 105–106, and an unauthorized data distributor 117. Each of the wireless communication system 101–102 includes a controller 107–108, base stations 108–111, radio frequency (RF) communication resources 112–113, and communication units 114–115. Communication units 114–115 transceive information over allocated communication resources 112–113 with the base stations 108–111, wherein allocation of the RF communication resources is controlled by the controller 107. The information transceived over the RF communication resources 112–113 includes control information and data information. The control information includes requests for service, status information, and resource allocation information and is transceived over the control channel, while data information includes voice data, text data, audio data, video data, company financial records, historical records, survey data, multimedia data, or any other information that is available in an electronic form and is transmitted over working channels, i.e., the RF communication resources allocated by the controller 107–108.

When the communication unit 114–115 is requesting a data transmission from a data distributor 105–106, the controller 107–108 needs to establish wireless and wireline paths between the data distributor 105–106 and the communication unit 114–115. Once the paths are established, the data distributor 105–106, which may be a data warehouse that distributes the data information, routes the requested data to the communication unit via these paths. Typically, the data distributor will only transfer this data for a fee to a registered communication unit user. If, when the data distributor receives the request, the requesting communication unit is not identified as a registered communication unit user, the data distributor will not forward the data. For example, assume that the data distributor, or particular database, 105–106 stores digitized versions of video movies and distributes them for a fee. Thus, each time a valid request is received, (i.e., the requesting unit is a registered communication unit user) the database operator transmits the requested movie and collects a fee for its service.

The above data information transfer process was described for the idea communication environment (i.e., one without pirates), but in a realistic communication environment 100, pirates often exist. As shown in FIG. 1, a pirate or "bad guy" database 117 is operably coupled to a pirate or "bad guy" receiver 116 and the public data system 104. The pirate database 117 accumulates the data information by monitoring RF communication resources 113 in the wireless communication system 102 via the pirate receiver 116. Once the pirate database 117 has accumulated a sufficient amount of the data information, the pirate database 117 can offer the same services as the authorized databases 105–106, but usually at a reduced rate, to the communication units. The pirate database 117 can offer reduced rates because it does not have to pay royalty fees, or other intellectual properties fees, as did the authorized databases 105–106. To the public data system 104 and the wireless systems 101–102, the pirate database 117 appears to be a valid data distributor, such that these devices would process service requests directed toward the pirate database 117 as they would for requests directed toward the authorized databases 105–106.

To detect pirate databases 117, the security gateway 103 is operably coupled between one or more wireless communication systems 101–102 and the public data system 104, wherein the public data system 104 may comprise a cable TV network, an Asynchronous Transfer Mode (ATM) network, an X.25 data network or a multitude of other data transfer networks. Generally, the security gateway 103 receives requests from the communication units 114–115 via the wireless communication systems 101–102 and routes the request to the addressed database 105, 106, 117 via the public data system. If the request is granted, the security gateway 103 routes the requested data to the communication unit via the wireless communication system 101–102. While the security gateway 103 is routing the data, it is also checking the data for a security tag. If a security tag, or is not found, the security gateway 103 inserts a security tag. If, however, the security tag is found, the security gateway 103 determines, based on the security tag, the authorized database 105–106 that originally distributed the data and compares the identity of the database currently distributing the data with the identity of the authorized database 105–106 that originally transmitted the data. If the identities between the original database and the current database differ, then the current database is identified as a potential unauthorized distributor of data.

Figure 2:
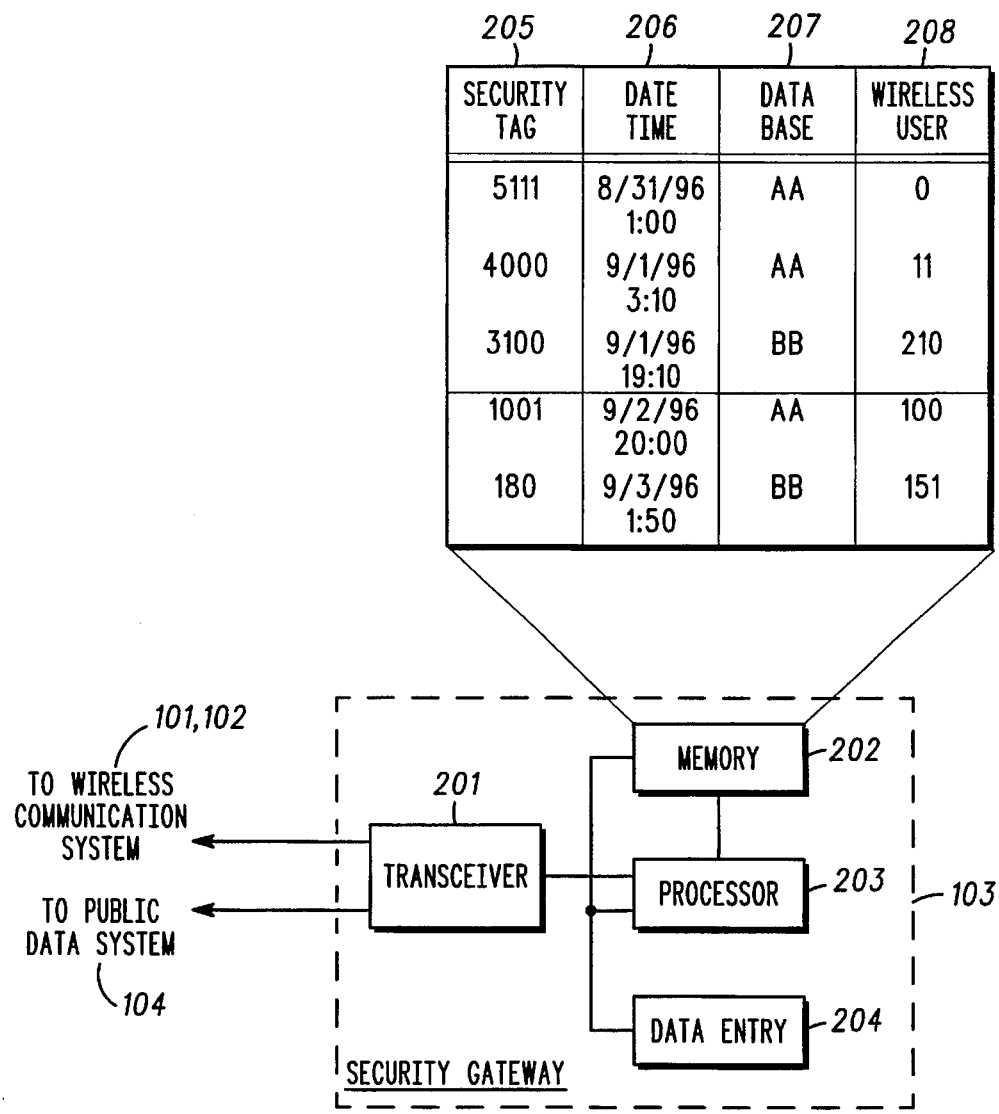
FIG. 2 illustrates a schematic block diagram of a security gateway in accordance with the present invention.

To implement this security service, the security gateway 103, as illustrated in FIG. 2, includes a transceiver 201, memory 202, a processor 203, and a data entry element 204. The security gateway 103 could be implemented in discrete components or a computer, such as a VME Computer manufactured by Motorola, Inc., that includes a processor 203, memory 202, data entry 204 and is further equipped with a transceiver 201 that matches the electrical interface types of the wireless communication system controllers 107–108 and the public data system 104. For the discrete implementation, the processor 203 could be a microprocessor, such as a 60840 manufactured by Motorola, Inc., or any other processor or digital signal processor suited for analyzing real time data streams, while the memory 202 is any digital storage element and the data entry 204, which is used to enter and retrieve security gateway 103 maintenance and alarm information that is typical with computer systems, is a keyboard, key pad, or the like. In either the discrete implementation or the VME computer implementation, the transceiver 201 is capable of interfacing with one public data system 104 and up to ten wireless communication systems 101–102.

In operation, the processor 203 receives decoded information from the transceiver 201 for all of the data transferred from the databases 105, 106, 117, via the public data system 104 to the wireless communication systems 101–102. Normally, the transceiver 201 passes the data to the wireless communication systems 101–102 and routes a copy of the data to the processor 203, such that the processor 203 can search the copied data for a security tag. Since the data transfer is a series of serial information transfers, the processor 203 uses cache memory, either within the processor 203 or within the memory 202, for temporary storage and analysis of the copied data.

The security tag may comprise a serial block of 10 eight bit bytes. The first 8 bytes are the tag number and the last 2 bytes are a 16 bit Cyclic Redundancy Check (CRC) checksum over the previous eight bytes. The calculations for 16 bit CRC's are well known in the computer and communications industry. The processor 203 continually calculates CRC's for the previous 8 bytes and compares that to the next two bytes. A CRC that matches the calculated CRC of the previous 8 bytes is used as a flag to indicate that the previous 8 bytes may be a valid security tag. An 8 byte binary number has approximately $1.845 \times 10^{19}$ permutations. Only a fraction of these will be used as valid security tags. To have enough capacity to tag a new transaction for ten communication systems every 1 second for five years, there are approximately $1.577 \times 10^{9}$ valid security tags out of the approximately $1.845 \times 10^{19}$ permutations. This keeps the security tag small while also providing a security tag that will not occur very often in the natural content of random data files. With the relatively small set of valid security tags out of the total number of 8 byte permutations, the probability of any single 8 byte permutation being a valid security tag is approximately $8.548 \times 10^{-11}$. When combined with the probability that a correct 2 byte CRC will be calculated for a random 8 byte field, the overall probability of falsely detecting a security tag in a random file is approximately $1.304 \times 10^{-15}$.

To illustrate the unlikely occurrence of falsely identifying, or being able to inject an accurate security tag by a pirate database, assume that a 9600 bits per second (bps) information stream is used to transfer data from the database 105, 106, 117 to the communication unit 114–115. At this data rate, a false security tag detection will occur once every 25,000 years. Those skilled in the art will realize that the minimization of false detection of security tags requirement is substantially met with the above described process, but could be further improved by selecting a different number of bytes to represent the security tag or to choose another method to minimize the false detection of a security tag within a random information stream.

When the processor 203 detects a valid CRC over the previous 8 bytes of a stream received from a database 105–106, it next determines if the previous 8 bytes are one of the $1.577 \times 10^9$ valid security tags. The numbers are assigned randomly so a database searching method is used by the processor 203 within the memory 202. These methods, such as binary searching, hashing, and others are well known in the computer industry and will not be described here. Once a valid security tag is found, it is used to point to a record within the memory 202, that is, the security tag itself does not contain any information about the original data transaction.

The memory 202 contains a security tag field 205, representing valid security tags that have been assigned, a date time field 206, representing the date and time when the original transaction occurred for the corresponding security tag, a database field 207, representing the identity of the original transmitting database 105–106, and a wireless user 208 field, which represents the target wireless communication system 101–102 and communication unit user that originally requested the data within the information transfer.

If the processor 203 determines that the 8 byte field is not a valid security tag, since it can not be found in the security tag field 205 within the memory 202, then it is ignored. If no security tag is found within the information transfer, the processor 203 assumes that this is an initial, or original, data transmission and will randomly assign a valid security tag number, calculate the CRC and insert the security tag and CRC into the information stream being transmitted by the transceiver 201 to the wireless communication system. At the same time, the processor 203 will enter a new record in the memory 202 for this transaction by recording the present date and time in the date time field 206, recording the database source number in the database field 207, and it will record the target wireless communication unit user identification in the wireless user field 208.

If the processor 203 determines that the 8 byte field is a valid security tag, since it can be found in the security tag field 205 within the memory 202, then the current source database identification is compared against the database identification stored in the database field 207 associated with this security tag. If the database identifications are the same, then it is ignored. If the database identifications are not the same, the security gateway automatically takes a predetermined course of action which may be identify the current database 117 as a potential unauthorized distributor of data, i.e., a pirate database. In this case, the security gateway 103 notifies the authorized distributor of the data that was illicitly transmitted by the pirate database 117. The authorized data distributor is considered to be the database identified by the original database field 207 from the record of the original transaction. The notification is a message transmitted to the authorized distributor via the public data system 104, wherein the message contains the elements of the record in the memory 202 associated with this security tag.

Figure 3:
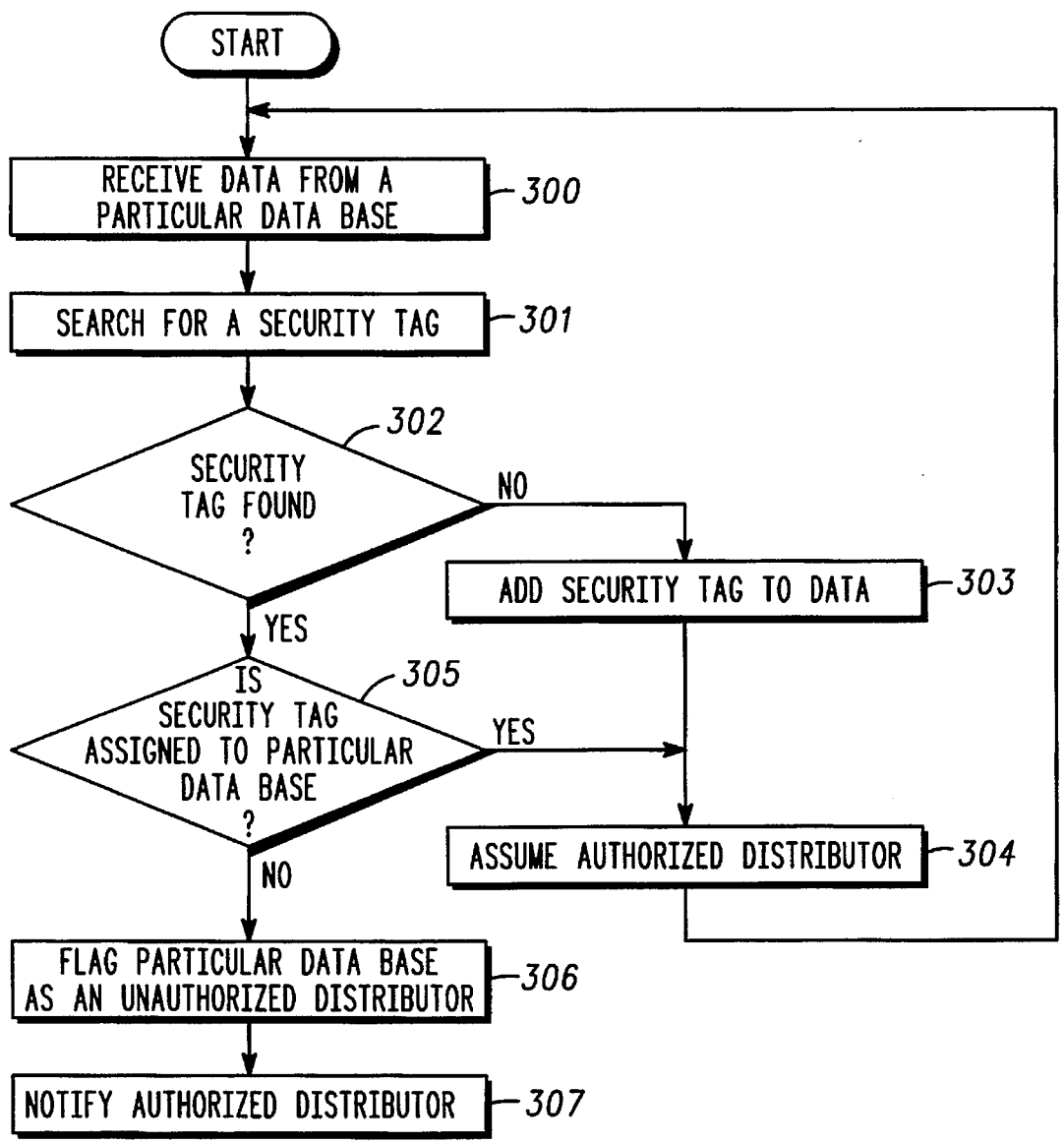
FIG. 3 illustrates a logic diagram that may be used to implement an embodiment of the present invention.

FIG. 3 illustrates a logic diagram that may be used to implement the present invention. At step 300, the security gateway receives data from a particular database via the public data system. Prior to receiving data from the database, the security gateway transferred a request for the data from a requesting communication unit to the database. Each message transfer between the element connected to the public data system uses source and destination address fields. Such message addressing to drive message routing is well known in the art, such as the Interact Protocol (IP), and will not be described any further here.

At step 301, the security gateway searches the received data for a security tag. The preferred embodiment carries out this function by calculating CRC's over the previous 8 bytes and then it compares that to the next 2 bytes in the data stream. The entire stream is examined. If the CRC matches, then those previous 8 bytes are compared against stored valid security tag numbers in the memory within the security gateway. If the CRC does not match, or if the 8 byte section does not match a valid security tag, and the entire transfer was searched, then it is assumed that this is an initial, or original, transmission of the data and a security gateway will add, as shown in step 303, a security tag to the data being transferred to the requesting communication unit. In addition, the security gateway makes a record of the newly created security tag and stores it in the memory. By adding the security tag in this manner, the security gateway assumes, as shown in step 304, that the current distributor database is assumed to be an authorized distributor.

If a valid security tag is found at step 302, which in the preferred embodiment means that the CRC calculation matched and that the security tag was found in the security gateway memory, then, at step 305, a comparison of the current particular database identification is made to the database identification stored in the database field associated with this security tag in the security gateway memory. If the database identifications match, then the transaction is assumed to be from an authorized distributor which is shown at step 304. If the comparison at step 305 does not match, then the current particular database, i.e., the database transferring the data, is flagged by the security gateway as an unauthorized distributor in step 306.

Databases that are flagged to be unauthorized are done so based on the information files which identified a different database as the original data distributor. For example, database 117 may be attempting to resell information to communication unit 114 that monitor receiver 116 previously received from a data transfer targeted for communication unit 115 from database 105. Next, in step 307, the security gateway will notify the authorized distributor of this potentially unauthorized distribution. For example, the security gateway will format a message and send it to database 105, wherein the message informs the database 105 that database 117 is attempting to resell its authorized data to communication unit 114 via wireless communication system 101. The message may also indicate how the pirate database 117 obtained the data, i.e., the pirate database eavesdropped on the data transmission from database 105 to communication unit 114 via wireless communication system 102. With this information, the operator of database 105 can take an appropriate action.

The present invention provides a method and apparatus for preventing unauthorized distribution of data within a wireless communication system. With such a method and apparatus, a new security gateway is provided that monitors data files being distributed from distributor databases to wireless communication units. The security gateway tags the data files from authorized data distributors with a special security tag and records the transaction for future use. Subsequent data file transfers are monitored for security tags to determine if the data is being distributed by an authorized data distributor. If the security tag reveals that a current data transmission is being executed by an authorized, or pirate, data distributor, the original database is notified. Once notified, the authorized data distributors may take appropriate action to prevent additional pirated transmissions and lost revenue.

We claim:

1. In a communication environment that includes a wireless communication system operably coupled to a public data system, wherein the wireless communication system includes a plurality of communication units, a method for preventing unauthorized distribution of data information within the wireless communication system, the method comprising steps of:

a) receiving, by a security gateway, the data information from a particular data base of the public data system;

b) searching, by the security gateway, the data information for a security tag;

c) when the security tag is found, determining, by the security gateway, whether the security tag is assigned to the particular data base; and d) when the security tag is not assigned to the particular data base, identifying, by the security gateway, the particular data base as a potential unauthorized distributor of the data information.

2. The method of claim 1, further comprising steps of:

e) determining, by the security gateway, an authorized distributor of the data information; and f) notifying the authorized distributor of the potential unauthorized distributor.

3. The method of claim 1, further comprising step of:

e) when the security tag is not found, integrating, by the security gateway, the security tag in to the data information.

4. The method of claim 3, step (e) further comprising the step of integrating in to the data information a reference to a record in memory of the security gateway and a check sum as the security tag.

5. The method of claim 4, step (e) further comprising the step of storing, in the record, an authorized data base identification code and a time stamp of transmission of the data information.

6. The method of claim 5, step (c) further comprising steps of:

accessing the authorized data base identification code;

comparing the authorized data base identification code with an identification code of the particular data base; and when the authorized data base identification code does not substantially match the identification code of the particular data base, indicating that the security tag is not assigned to the particular data base.

7. The method of claim 1 further comprising a step prior to receiving the data information, transmitting, by an authorized data base, the data information without a security tag.

8. A security gateway for preventing unauthorized distribution of data within a wireless communication system, the security gateway comprising:

a transceiver operably coupled to the wireless communication system and a public data base system;

a processor operably coupled to the transceiver, wherein the processor provides a security tag for data information received from the public data system and identifies unauthorized distributors of the data information received; and memory operably coupled to the processor, wherein the memory stores the security tag.

9. The security gateway of claim 8, wherein the processor further provides a time stamp for the data information received, wherein the time stamp is stored in the memory.

10. The security gateway of claim 8 further comprises a data entry element operably coupled to the processor and the memory, wherein the data entry element receives input regarding the public data base system.

11. The security gateway of claim 8, wherein the processor identifies the unauthorized distributors by searching the data information received for the security tag and comparing the security tag with the security tag stored in the memory.

* * * * *